United States Patent [19]

Nugent

[11] Patent Number: 5,718,939
[45] Date of Patent: Feb. 17, 1998

[54] CONTINUOUS SUGAR INFUSION PROCESS

[75] Inventor: Duane C. Nugent, Frankfort, Mich.

[73] Assignee: Graceland Fruit Cooperative, Inc., Frankfort, Mich.

[21] Appl. No.: 709,727

[22] Filed: Sep. 9, 1996

[51] Int. Cl.⁶ .................................................. D23L 1/09
[52] U.S. Cl. ................................. 426/615; 426/639
[58] Field of Search .............................. 426/639, 615

[56]  References Cited

U.S. PATENT DOCUMENTS

| | | | |
|---|---|---|---|
| 772,018 | 10/1904 | Alexandrian | 426/639 |
| 1,703,730 | 2/1929 | Fraisse | 426/639 |
| 4,183,963 | 1/1980 | Brimelow et al. | 426/639 |
| 4,256,772 | 3/1981 | Shanbhag et al. | |
| 4,350,711 | 9/1982 | Kahn et al. | 426/639 |
| 4,626,434 | 12/1986 | O'Mahony et al. | |
| 4,713,252 | 12/1987 | Ismail | |
| 5,000,972 | 3/1991 | Nafisi-Movaghar | |
| 5,320,861 | 6/1994 | Mantius et al. | |

*Primary Examiner*—Helen Pratt
*Attorney, Agent, or Firm*—Donald R. Fraser

[57]  ABSTRACT

A process for infusing sugar into fruits and vegetables comprises the steps of providing a quantity of produce, treating the produce for a period of time sufficient to cause osmotic rupturing of at least a portion of the cells within the produce by contacting the produce with water, then infusing the treated produce by contacting it with a concentrated infusion syrup in a stage-wise manner for a time sufficient to prepare an infused produce having a Brix level from about 40° to about 52°.

12 Claims, 2 Drawing Sheets

5,718,939

CONTINUOUS SUGAR INFUSION PROCESS

FIELD OF THE INVENTION

This invention relates generally to a continuous process for infusing fruits and vegetables with sugar. More particularly, the invention is directed to a process for treating the fruits or vegetables with water for a period of time sufficient to cause osmotic rupturing of the cells of the fruits or vegetables which makes the cells more receptive to sugar infusion, followed by infusing the fruits or vegetables with sugar in a stage-wise manner utilizing a concentrated sugar infusion syrup.

BACKGROUND OF THE INVENTION

Various methods for infusing fruits and vegetables (hereinafter referred to occassionally as "produce" with sugar are well known in the art. Early methods for infusing produce included simply storing the produce immersed in a sugar/water solution within a container. When the container was later opened, it was observed that water had been extracted from the produce and sugar had been infused into the produce.

Thereafter, batch processes for infusing large quantities of produce were developed. Such a process may consist of charging several hundred gallons of a high Brix syrup (45° to 67°) to a large tank, circulating the syrup, adding more sugar to the syrup, heating the syrup to a temperature from about 100° F. to about 140° F., then immersing the produce therein. Typically, the syrup is circulated over and through the bed of produce, and the temperature of the system is lowered to an infusion temperature between about 60° F. and about 110° F., depending upon the type of produce being infused. This combination of produce and syrup is maintained within the tank for a period of time ranging from about 3 to about 12 hours. At the end of this time period, the concentrations of sugar in the syrup and the produce will be nearly equal, i.e., within about 5° to about 15° Brix of each other. Thus, the produce will have been infused with sugar to a level of perhaps 40° to 52° Brix, depending upon the produce being infused. After the infused produce is removed, the spent infusion syrup is reconcentrated by the evaporation of water therefrom and recycled back to the tank to begin the batch process again. Batch infusion processes are disclosed in U.S. Pat. No. 5,000,972 to Nafisi-Movaghar, U.S. Pat. No. 4,713,252 to Ismail, U.S. Pat. No. 4,626,434 to O'Mahony et al., and U.S. Pat. No. 4,256,772 to Shanbhag et al.

Recently, continuous processes for infusing fruit have been developed. U.S. Pat. No. 5,320,861 to Mantius et al. discloses a two-step process for initially extracting the juice from the fruit then infusing the fruit with sugar. The patent states that the post-extraction fruit (prior to the infusion step) has a concentration of fruit juice of about 1% by weight. The juice extracted from the fruit is purified and sold, and the soluble sugars contained in the juice are not utilized to infuse the extracted fruit in a subsequent process step. The disclosed extraction step is time-consuming, requiring from 90 to 150 minutes, thus resulting in an overall fruit infusion process requiring several hours.

It would be desirable to develop a continuous process for infusing produce which does not require the extraction of substantially all of the juice from the produce.

SUMMARY OF THE INVENTION

Accordant with the present invention, there surprisingly has been discovered a continuous process for infusing fruits and vegetables with sugar. The process comprises the steps of:

providing a quantity of produce;

treating the produce for a period of time sufficient to cause osmotic rupturing of at least a portion of the cells within the produce, by contacting the produce with water, to prepare a treated produce and waste water; and infusing the treated produce, by contacting the treated produce with a concentrated infusion syrup in a stage-wise manner for a time sufficient to prepare an infused produce having a Brix level from about 40° to about 52° and a spent syrup.

Alternatively, in another embodiment of the present invention, the process for infusing fruits and vegetables comprises the steps of:

providing a quantity of produce;

treating the produce for a period of time sufficient to cause osmotic rupturing of at least a portion of the cells within the produce, by contacting the produce with water, to prepare a treated produce and waste water;

infusing the treated produce, by contacting the treated produce with a concentrated infusion syrup in a stage-wise manner for a time sufficient to prepare an infused produce having a Brix level from about 40° to about 52° and a spent syrup;

rinsing the infused produce, by contacting the infused produce with at least a portion of the waste water, to prepare a rinsed produce and rinse water;

mixing the rinse water and spent syrup and adding sugar to the mixture, to prepare an infusion syrup;

concentrating the infusion syrup, by removing water therefrom, to prepare the concentrated infusion syrup; and drying the rinsed produce.

The process of the present invention are particularly suited for infusing sugar into various fruits and vegetables, to prepare a food product which may be eaten as a snack, mixed with dry breakfast cereals, added to cake mixes, used in confections, etc.

Further objects and advantages of this invention will be apparent from the following description and appended claims, reference being made to the accompanying drawings forming a part of the specification, wherein like reference characters designate corresponding parts in the several views.

BRIEF DESCRIPTION OF THE DRAWING

The novel features considered characteristic of the present invention are set forth with particularity in the appended claims. The invention itself, however, will best be understood from the accompanying description of specific embodiments when read in connection with the attendant Figures which illustrate continuous processes for infusing sugar into produce embodying the features of the present invention, wherein:

DETAILED DESCRIPTION OF THE PREFERRED EMBODIMENT

Figure 1:
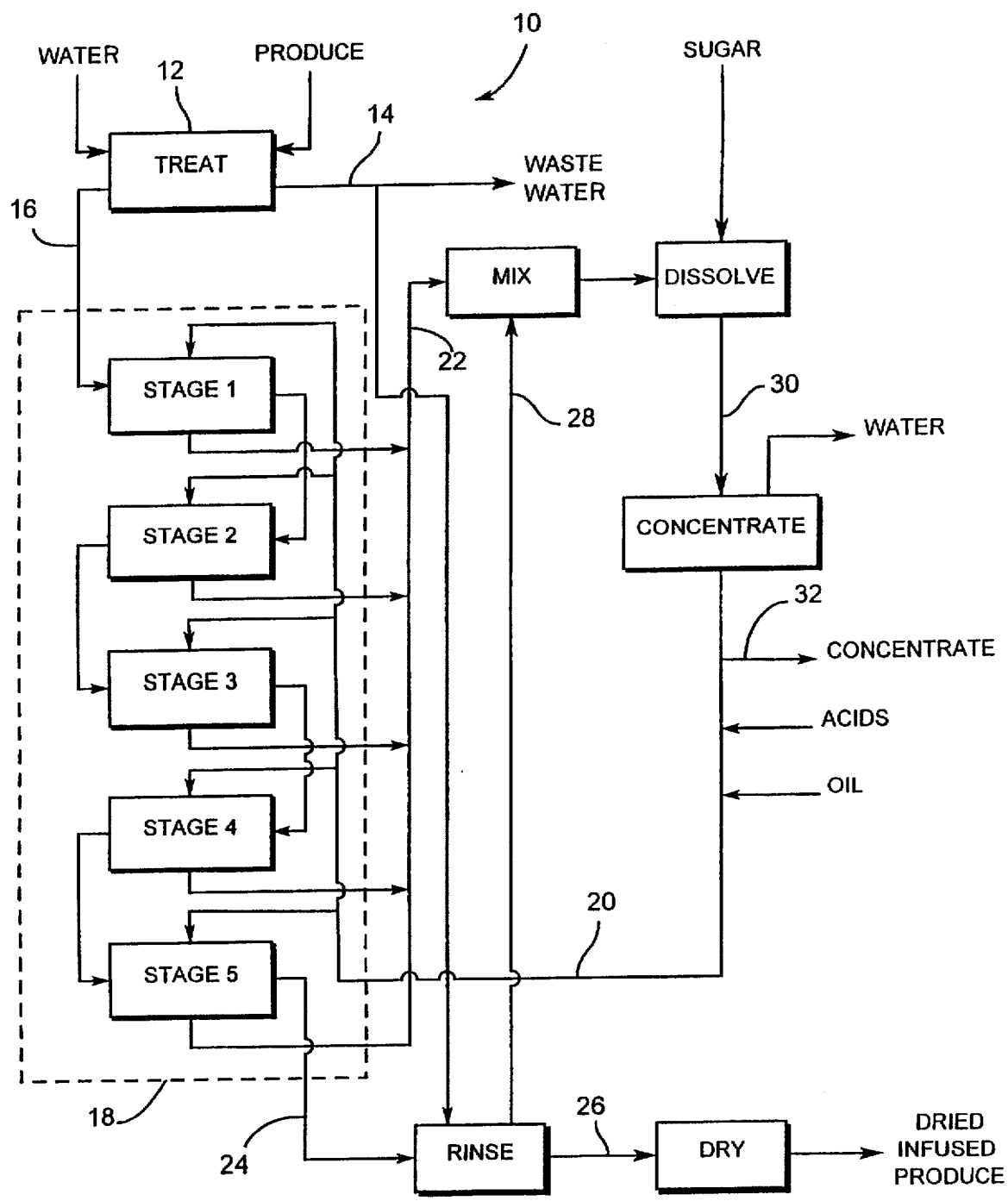
FIG. 1 is a schematic representation of an infusion process according to the present invention.

The present invention is directed to a continuous process for infusing sugar into fruits and vegetables, followed by drying. Suitable produce for use in practicing the present invention include, but are not necessarily limited to, cherries, cranberries, blueberries, strawberries, peaches, bananas, apples, pineapples, mangos, carrots, beans, peas, potatoes, and the like. This process effectively depresses the water activity of the produce to a level at which most bacteria will not grow. Thus, the infused produce is rendered microbiologically stable and need not be refrigerated or frozen. The process comprises treating the produce for a period of time sufficient to cause osmotic rupturing of at least a portion of the cells within the produce by contacting the produce with water, followed by infusing the treated produce by contacting same with a concentrated sugar infusion syrup in a stage-wise manner.

Referring now to the Figures, there is shown generally at 10 a continuous process for infusing produce embodying the features of the present invention. A quantity of produce is introduced to a device 12 where it may be treated for a period of time sufficient to cause osmotic rupturing of at least a portion of the cells within the produce, by contacting the produce with water. Typically, the produce is charged to the device 12 at a rate from about 1,000 pounds per hour to about 6,000 pounds per hour, while water is charged to the device 12 at a rate from about fifty percent (50%) to about three hundred percent (300%) of the produce charge rate. The time period sufficient to cause osmotic rupturing of at least a portion of the cells of the produce by contacting the produce with water is generally from about thirty (30) minutes to about three (3) hours. The osmotic rupturing is generally carried out at a temperature from about 50° F. to about 100° F. It has been discovered that the osmotic rupturing of a least a portion of the cells of the produce makes the produce more receptive to sugar infusion than simply attempting to infuse the produce by immersing it into an infusion syrup bath. While not wishing to be bound by any particular theory regarding the mechanism by which treating the produce to cause osmotic rupturing makes the produce more receptive to sugar infusion, it is theorized that some of the produce cells expand and rupture due to the osmotic pressure of the pure water, but would not expand and rupture under the sugar syrup osmotic pressure.

This initial step of treating the produce to cause osmotic rupturing is in contrast to prior art processes which treat fruit with water to an extent such that the juice within the fruit is substantially completely extracted from the fruit. For example, U.S. Pat. No. 5,320,861 to Mantius et al. discloses water extraction of fruit to the extent that the fruit retains only 1% of its juice content. By contrast, the present invention merely requires that the water contact the produce for a period of time sufficient to cause osmotic rupturing of at least a portion of the cells of the produce. Thus, the waste water 14 generated by the initial treatment step of the present invention contains only a very minor amount of juice from the produce, i.e., from about one percent (1%) to about five percent (5%) by weight.

The device 12 utilized to effect the osmotic rupturing of the fruit cells may be any device conventionally known in the art for contacting a bed of produce with a stream of water, such as for example a tank. Preferably, the treating process is carried out by depositing the produce onto a tray with perforated sides and moving flights or onto a porous endless belt, which causes the produce to proceed in a substantially horizontal direction. Water is then sprayed onto the produce from above. The water passes over and through the bed of produce and is collected below the tray or belt. The treated produce 16 is then discharged from the end of the tray or belt, and conveyed to the next process step. The process of osmotic rupturing thus effected is known to those involved in molecular biology, but has never been utilized as a preliminary treatment for fruit that is subsequently sugar infused utilizing a stage-wise infusion process. Typically, the residence time for the produce in any particular stage ranges from about 0.5 hour to about 2 hours. The temperature at which the infusion is carried out ranges generally from about 60° F. to about 110° F.

Figure 2:
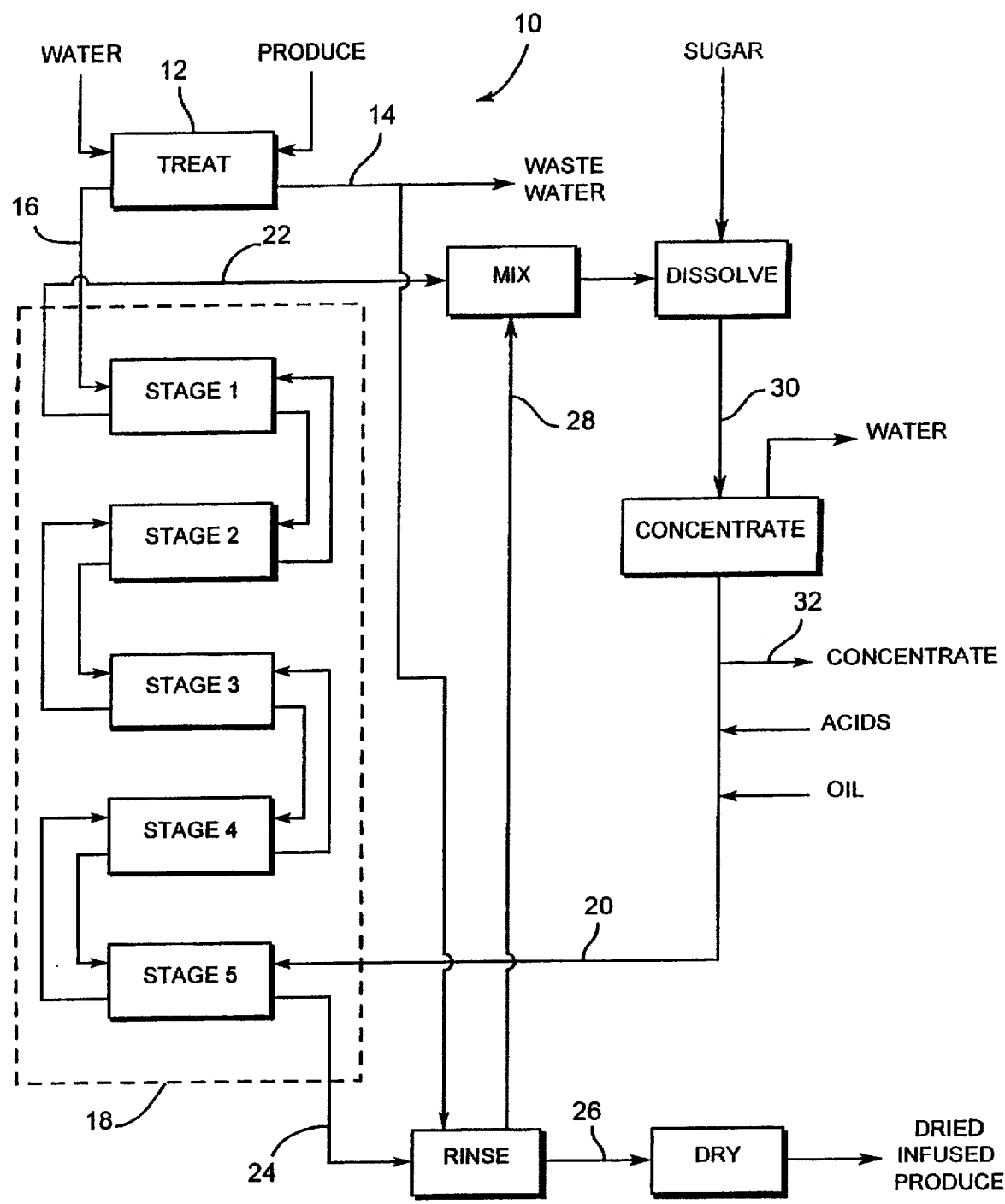
FIG. 2 is a schematic representation of a counter-current infusion process according to the present invention.

As illustrated in FIG. 1, the treated produce is then conveyed to a stage-wise infusion device 18, comprising a series of step-wise stages. Each stage may comprise a pan with moving flights or an endless belt, and an associated infusion syrup spray system, as described hereinabove for the osmotic rupturing treatment device. The stages may be configured such that the fruit discharged from any one stage drops by gravity to the beginning of the next stage, while the infusion syrup is directed from a manifold system to each individual stage. Preferrably, the infusion syrup flows in a counter-current direction; i.e., the infusion syrup from any one stage is collected and pumped to the previous stage, as illustrated in FIG. 2. Thus, the treated fruit 16 is infused in a stage-wise, preferably counter-current, process. Stage-wise processes are well known to those ordinarily skilled in the art, and do not require further explanation herein.

A concentrated infusion syrup 20 is introduced to the infusion device 18, generally at a flow rate from about 300 gallons per hour to about 2,000 gallons per hour. The concentrated infusion syrup conveniently has a sugar concentration from about 45° to about 72° Brix. The Brix scale is a hydrometer scale for sugar solutions so graduated that its readings at a specific temperature represent percentages by weight of the sugar solutions. By the term "sugar" as it is used herein is meant monosaccharide, disaccharide, and polysaccharide materials. Preferably, the sugar comprises fructose, sucrose, glucose, dextrose, or a mixture thereof. The concentrated infusion syrup 20 is sprayed over and through the beds of produce contained in the infusion device 18. The liquid collected from the infusion device 18 is spent syrup 22 which is recirculated for use in the produce infusion process. Although five stages of the infusion device 18 are illustrated in the Figures, it will be readily apparent to one ordinarily skilled in the art that a greater or fewer number of stages may be employed in the infusion process.

It has been observed that the sugar infusion process within the infusion device 18 is most effective when the Brix levels between the syrup and produce at any particular stage are within about 5° to about 20°. Moreover, it is desired to achieve a substantially uniform change in the Brix level of the produce from one stage to the next. A higher yield is achieved when the infusion occurs over an even delta Brix between the produce and syrup in each stage, compared to batch sugar infusion which begins with a high initial Brix level between the produce and syrup and ends with a low delta Brix at the end of the infusion process.

Infused produce 24 exits from the last stage of the infusion device 18, and is rinsed using at least a portion of the waste water 14 (which has a lower Brix than the infused produce) that is a byproduct of the osmotic rupturing step. The rinse flow rate generally ranges from about 500 gallons per hour to about 1,500 gallons per hour. This rinsing operation may be carried out in any conventional containment device such as a flume and results in the production of rinsed produce 26 and rinse water 28. The rinse water contains syrup removed from the surfaces of the infused produce 24 particles, which syrup is then mixed with the spent syrup 22 exiting from the infusion device 18. Sugar is dissolved in the mixture of rinse water 28 and spent syrup 22 by any conventional method such as adding the ingredients to a stirred mixing tank. The addition of sugar effectively increases the Brix level, thereby replacing the removed sugar and producing an infusion syrup 30 for use in the infusion process step.

Because the Brix level of the infusion syrup 30 is not high enough to practice effective produce infusion, the infusion syrup 30 is concentrated to remove water therefrom. Such concentration may generally be accomplished by heating the infusion syrup 30 by conventional means to evaporate water therefrom. The resultant concentrated infusion syrup 20, having a Brix level from about 45° to about 72°, is then introduced to the infusion device 18. Concentrated infusion syrup 20 may be removed from the system as a concentrate 32, for supplying to the manufacturers of flavored food products such as carbonated beverages and candies. Adjuvants, such as acids and/or oils may be added to the concentrated infusion syrup 20 for use in the produce infusion process step. For example, glycerine may be added to produce a glycerated product.

Finally, the rinsed produce 26 is conveyed through a conventional dryer to prepare dried infused produce, according to the present invention.

The process for continuously infusing produce with sugar described hereinabove is generally disclosed in terms of its broadest application to the practice of the present invention. Occasionally, however, the process conditions as described may not be precisely applicable to each kind of produce included in the disclosed scope. Those instances where this occurs will be readily recognized by those ordinarily skilled in the art. In all such cases, the process may successfully be performed by routine modifications to the disclosed process, e.g., by using a higher or lower Brix infusion syrup, by using alternate residence times and temperatures for the osmotic rupturing step, etc., or other modifications which are otherwise conventional may be employed.

The invention is more easily comprehended by reference to the specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A continuous process for infusing fruits and vegetables with sugar, comprising the steps of:

providing a quantity of produce;

treating the produce for a period of time sufficient to cause osmotic rupturing of at least a portion of the cells within the produce, by contacting the produce with water, to prepare a treated produce and waste water;

infusing the treated produce, by contacting the treated produce with a concentrated infusion syrup in a counter-current, stage-wise manner for a time sufficient to prepare an infused produce having a Brix level from about 40° to about 52° and a spent syrup;

rinsing the infused produce, by contacting the infused produce with at least a portion of the waste water, to prepare a rinsed produce and rinse water;

mixing the rinse water and spent syrup and adding sugar to the mixture, to prepare an infusion syrup;

concentrating the infusion syrup, by removing water therefrom, to prepare the concentrated infusion syrup; and drying the rinsed produce.

2. The process for infusing fruits and vegetables according to claim 1, wherein the produce is provided at a rate from about 1,000 pounds per hour to about 6,000 pounds per hour.

3. The process for infusing fruits and vegetables according to claim 1, wherein the period of time for treating the produce to cause osmotic rupturing of at least a portion of the cells within the produce ranges from about 30 minutes to about 3 hours.

4. The process for infusing fruits and vegetables according to claim 1, wherein the water for contacting the produce is supplied at a rate from about 50% to about 300% of the produce charge rate.

5. The process for infusing fruits and vegetables, according to claim 1, wherein the concentrated infusion syrup for contacting the treated produce is supplied at a rate from about 300 gallons per hour to about 2,000 gallons per hour.

6. The process for infusing fruits and vegetables according to claim 1, wherein the time for contacting the treated produce with the concentrated infusion syrup in each stage ranges from about 0.5 hour to about 2 hours.

7. The process for infusing fruits and vegetables according to claim 1, wherein the temperature at which the water is contacted with the produce to cause osmotic rupturing of at least a portion of the cells within the produce ranges from about 50° F. to about 100° F.

8. The process for infusing fruits and vegetables according to claim 1, wherein the temperature at which the treated produce is contacted with the concentrated infusion syrup ranges from about 60° F. to about 110° F.

9. The process for infusing fruits and vegetables according to claim 1, wherein the concentration of juice from the produce in the waste water ranges from about 1% to about 5% by weight.

10. The process for infusing fruits and vegetables according to claim 1, wherein the flow rate of waste water used to rinse the infused produce ranges from about 500 gallons per hour to about 1,500 gallons per hour.

11. The process for infusing fruits and vegetables according to claim 1, wherein the sugar comprises a sugar selected from the group consisting of fructose, sucrose, glucose, dextrose, and mixtures thereof.

12. The process for infusing fruits and vegetables according to claim 1, wherein the infusion syrup is concentrated to prepare a concentrated infusion syrup having a Brix level from about 45° to about 72°.

* * * * *